US006184855B1

(12) United States Patent
Kobayashi et al.

(10) Patent No.: US 6,184,855 B1
(45) Date of Patent: Feb. 6, 2001

(54) LIQUID CRYSTAL DISPLAY PANEL DRIVING DEVICE

(75) Inventors: Yoshinao Kobayashi, Hiratsuka; Akihiro Kuroda, Yokohama; Yoshitami Sakaguchi, Zama, all of (JP)

(73) Assignee: International Business Machines Corportion, Armonk, NY (US)

( * ) Notice: Under 35 U.S.C. 154(b), the term of this patent shall be extended for 0 days.

(21) Appl. No.: 08/981,766

(22) PCT Filed: Jun. 9, 1995

(86) PCT No.: PCT/JP95/01167

§ 371 Date: Dec. 5, 1997

§ 102(e) Date: Dec. 5, 1997

(87) PCT Pub. No.: WO96/42033

PCT Pub. Date: Dec. 27, 1996

(51) Int. Cl.[7] .............................. G09G 3/36; G02F 1/133

(52) U.S. Cl. ................................ 345/100; 345/96; 345/94

(58) Field of Search ................................ 345/96, 100, 90, 345/94, 55, 204

(56) References Cited

U.S. PATENT DOCUMENTS

| | | | | |
|---|---|---|---|---|
| 4,499,459 | * | 2/1985 | Sasaki et al. | 340/752 |
| 5,041,823 | * | 8/1991 | Johnson et al. | 340/784 |
| 5,694,145 | * | 12/1997 | Kondo et al. | 345/90 |

* cited by examiner

*Primary Examiner*—Steven J. Saras
*Assistant Examiner*—William Spencer
(74) *Attorney, Agent, or Firm*—R. P. Tassinari

(57) ABSTRACT

An analog driver for a liquid crystal display has sample hold circuits and buffer amplifiers divided into one group for positive inputs and the other groups for negative inputs which buffer amplifiers are selected in accordance with a first and second control signals thereby reducing the power consumption by the driver of buffer amplifiers. Furthermore, when none of the buffer amplifiers are selected, the data lines are held at common voltage to reduce the consumed power by the buffer amplifiers.

16 Claims, 13 Drawing Sheets

LIQUID CRYSTAL DISPLAY PANEL DRIVING DEVICE

TECHNICAL FIELD

The present invention relates to a driver for a liquid crystal display (LCD), more panel particularly to an analog LCD driver for performing HV inversion or H inversion, and one or two sided drive.

BACKGROUND ART

Source drivers for driving a TFT (Thin Film Transistor)/LCD panel are of digital type and of analog type. According to the digital type, luminosity data corresponding to each pixel is delivered to a driver as a digital value and the driver latches the digital value and outputs the voltage corresponding to it. Methods for outputting the voltage are a switch scheme and a digital analog conversion (DAC) scheme. The switch scheme is performed by selecting and outputting one of a plurality of reference voltages. A driver using this scheme, can employ 4 bits (16 gradations) or 6 bits (64 gradations) requiring, but 16 or 64 switches for each output of the driver. It is impractical to implement gradations of more than 6 bits. The DAC scheme is performed by preparing a DAC for each output of the driver converting the received luminosity data into an analog value output. Disadvantages of this scheme are that it requires a large sized circuit and it is difficult to equate the performance of DAC provided for each output.

The output voltage of such a digital driver normally ranges from 0 V to 5 V. To cope with an LCD that is alternately driven between 0 V and 6 V and between 0 V and −6 V, a scheme of common inversion drive is adopted. This common inversion drive, changes the voltage of the common electrode of the LCD panel at a predetermined period (AC drive) as a result, the output of the driver appears to cover in the range of 1 V to 6 V and that of −1 V to −6 V (the range of 1 V to −1 V is a non-sensitive band). The period for which the voltage of this common electrode can be AC-driven is limited to the period of a horizontal sync. signal (H period). With this H inversion scheme, since a cross talk takes place in the horizontal direction of the screen, the deterioration of the screen presentation is inevitable.

With the analog type, conversion is not performed in each driver, luminosity data corresponding to each pixel is delivered to a driver in an analog value and the analog value is held in a sample hold circuit and outputted through a buffer amplifier. Since the analog type allows voltages of −6 V to 6 V can be outputted as a matter of course, it is unnecessary to perform the common inversion drive. While use of a high withstand voltage element leads to an increase in the size of each element, with proper circuit design, there is a good possibility that the total size can be made smaller than that of the digital driver. Furthermore, because of being able to cope with an infinite levels of gradations using the same circuit independently of the number of gradations, the analog driver is fit to implement more 256 gradations (full color). In addition, since it is not required to perform a common inversion drive, the HV inversion drive scheme which performs opposite-polarity write to neighboring pixels is implementable. Furthermore since no cross talk takes place, a high-quality image can be displayed.

While this, the analog type provides a high quality image, however significant design effort is required to suppress the variation of outputs and the occurrence of errors to sufficiently low limits. Furthermore, an output amplifier with a large power consumption is needed. As mentioned above, this is because outputs of from −6 V to 6 V are needed.

Accordingly, analog drivers have thus far not been utilized often for purposes having stringent requirements for power consumption, such as the display of a notebook PC, where used most of them have been large-sized drivers for high resolution displays, such as XGA or SVGA in a way to drive the source line of the LCD panel from the top and the bottom of the panel. In Published Unexamined Patent Application No. 6-295162, a scheme of driving by the two-side drive method is described.

SUMMARY OF THE INVENTION

It is one object of the present invention, therefore, to provide an LCD panel driver enabling the use of H inversion and HV inversion and enabling one and two-sided drive.

It is another object to reduce the power consumption in the analog LCD driver.

To attain these objects, one aspect of LCD panel driver comprises: a plurality of sample hold and buffer amplification units for positive input each including a sample hold circuit for sampling and holding an input video signal having a positive polarity in response to a first control signal (−SPP) and having a buffer amplifier activated during the holding for charging a data line in an LCD panel; a plurality of sample hold and buffer amplification units for negative input each including a sample hold circuit for sampling and holding an input video signal having a negative polarity in response to a second control signal (+SPN) and having a buffer amplifier activated during the holding for discharging a data line in an LCD panel; an output selector for selecting one of the buffer amplifiers in a group including one of the plurality of sample hold and buffer amplification units for a positive input and one of the plurality of sample hold and buffer amplification units for a negative input in response to a third control signal (B_SelP & N), wherein the output selector has means for connecting the data line to a common voltage while no buffer amplifier is selected; a bidirectional register for generating sampling pulses; and a controller for generating the first and second control signals which control the timing of sampling and holding in the sample hold circuits and the third control signal from a mode specification signal specifying whether one-side drive or two-side drive, and HV inversion or H inversion, a fourth control signal created in response to a Horizontal sync. signal and Vertical sync. signal to control the polarity of output voltage to the LCD panel and the sampling pulses.

A user using this LCD panel driver inputs a mode specification signal directing whether one-side drive or two-side drive, and HV inversion or H inversion is performed. Using this mode specification signal and the fourth control signal created by the external controler from a Horizontal sync. (HS) signal and Vertical sync. (VS) signal, the third control signal used in the output selector and the first and second control signal used in sample hold and buffer amplification units for a positive input and for a negative input are provided. In this manner, a wide variety of user's requests can be accommodated.

In addition, the sample hold and buffer amplification units are divided into those for positive inputs and those for the negative inputs, and those sample hold and buffer amplification units are selected by the first and second control signal. Therefore the drive of buffer amplifiers is cut in half. Futhermore, an output of the operating sample hold and buffer amplification unit selected by the third control signal is arranged so as to be outputted to the data line (source line)

of the LCD panel during the period for which neither half of them is selected, the data line is connected to the common voltage. Accordingly the power consumption in the buffer amplifiers is reduced.

Another aspect of the present invention comprises: a plurality of sample hold and buffer amplification units for positive input each including a sample hold circuit for sampling and holding an input video signal having a positive polarity in response to a first control signal (−SPP) and having a buffer amplifier activated during the holding for charging a data line in an LCD panel; a plurality of sample hold and buffer amplification units for negative input each including a sample hold circuit for sampling and holding an input video signal having a negative polarity in response to a second control signal (+SPN) and having a buffer amplifier activated during the holding for discharging a data line in an LCD panel; an output selector for selecting one of the buffer amplifiers in a group including one of the plurality of sample hold and buffer amplification units for a positive input and one of the plurality of sample hold and buffer amplification units for a negative input in response to a third control signal (B_SelP & N), wherein the output selector has means for connecting the data line to a common voltage while no buffer amplifier is selected; a bidirectional register for generating sampling pulses; a controller for generating the third control signal and a fifth control signal for distributing the sampling pulses to any of the groups including the sample hold and buffer amplification units for a positive input and the sample hold and buffer amplification units for a negative input from a mode specification signal specifying whether one-side drive or two-side drive, and HV inversion or H inversion and a fourth control signal created in response to a Horizontal sync. signal and Vertical sync. signal to control the polarity of output voltage to the LCD panel; and a plurality of pulse distributors for generating the first and second control signals which control the timing of sampling and holding in the sample hold circuits from the fifth control signal and the sampling pulses.

With this aspect, the controller in the above-mentioned aspect is divided into a controller and pulse distributors.

Furthermore, a still another aspect of the present invention comprises: a plurality of sample hold and buffer amplification units for positive input each including a sample hold circuit for sampling and holding an input video signal having a positive polarity in response to a first control signal (−SPP) and having a buffer amplifier activated during the holding for charging a data line in an LCD panel; a plurality of sample hold and buffer amplification units for negative input each including a sample hold circuit for sampling and holding an input video signal having a negative polarity in response to a second control signal (+SPN) and a buffer amplifier activated during the holding for discharging a data line in an LCD panel; an output selector for selecting one of the buffer amplifiers in a group including one of the plurality of sample hold and buffer amplification units for a positive input and one of the plurality of sample hold and buffer amplification units for a negative input in response to a third control signal (B_SelP & N), wherein the output selector has means for connecting the data line to a common voltage while no buffer amplifier is selected; a bidirectional register for generating sampling pulses; and a controller for generating the third control signal and a fourth control signal which controls the polarity of the output to the LCD panel from a mode signal specifying whether one-side drive or two-side drive, and HV inversion or H inversion and from a Horizontal sync. signal and Vertical sync. signal and a plurality of pulse distributors for generating the first and second control signals which control the timing of sampling and holding in the sample hold circuits from the fourth control signal and the sampling pulses.

In this aspect, one section of the external controller is provided in this driver. In other words, with the above two aspects, the fourth control signal is created from the Horizontal sync. signal and Vertical sync. signal, while the section for creating this fourth control signal is also provided in the driver. In this manner, the configuration of an external controller is simplified.

In the above three aspects, it is advisable that each of the sample hold and buffer amplification units for a positive input and the sample hold and buffer amplification units for a negative input comprises: a first switching means having the input terminal for the input video signal wherein the first switching means is switched by a first switch signal; a second switching means having the input terminal connected to the output terminal of the first switching means wherein the second switching means is switched by the first switch signal; a hold capacitor having one terminal connected to the output terminal of the second switching logic for charging for the input video signal; a buffer amplifier whose input side is connected to the output terminal of the second switching means; and a third switching means having one terminal connected to the input terminal of the second switching means and having the other terminal connected to the output side of the buffer amplifier, wherein the third switching means is switched by a second switch signal, wherein the first switch signal changes in such a manner as to activate the first and second switch means for the sampling period and the second switch signal changes in such a manner as to activate the third switch means for the holding period. In such a sample hold and buffer amplification unit, a high-speed and accurate sample hold is performed.

Alternatively, the above hold capacitor may be connected to a means for compensating a change in the hold voltage of the hold capacitor. In this manner, a more accurate sample hold is performed.

It goes without saying that the above-mentioned LCD panel drivers are used in an LCD panel.

BEST MODE FOR CARRYING OUT THE INVENTION

Figure 1:
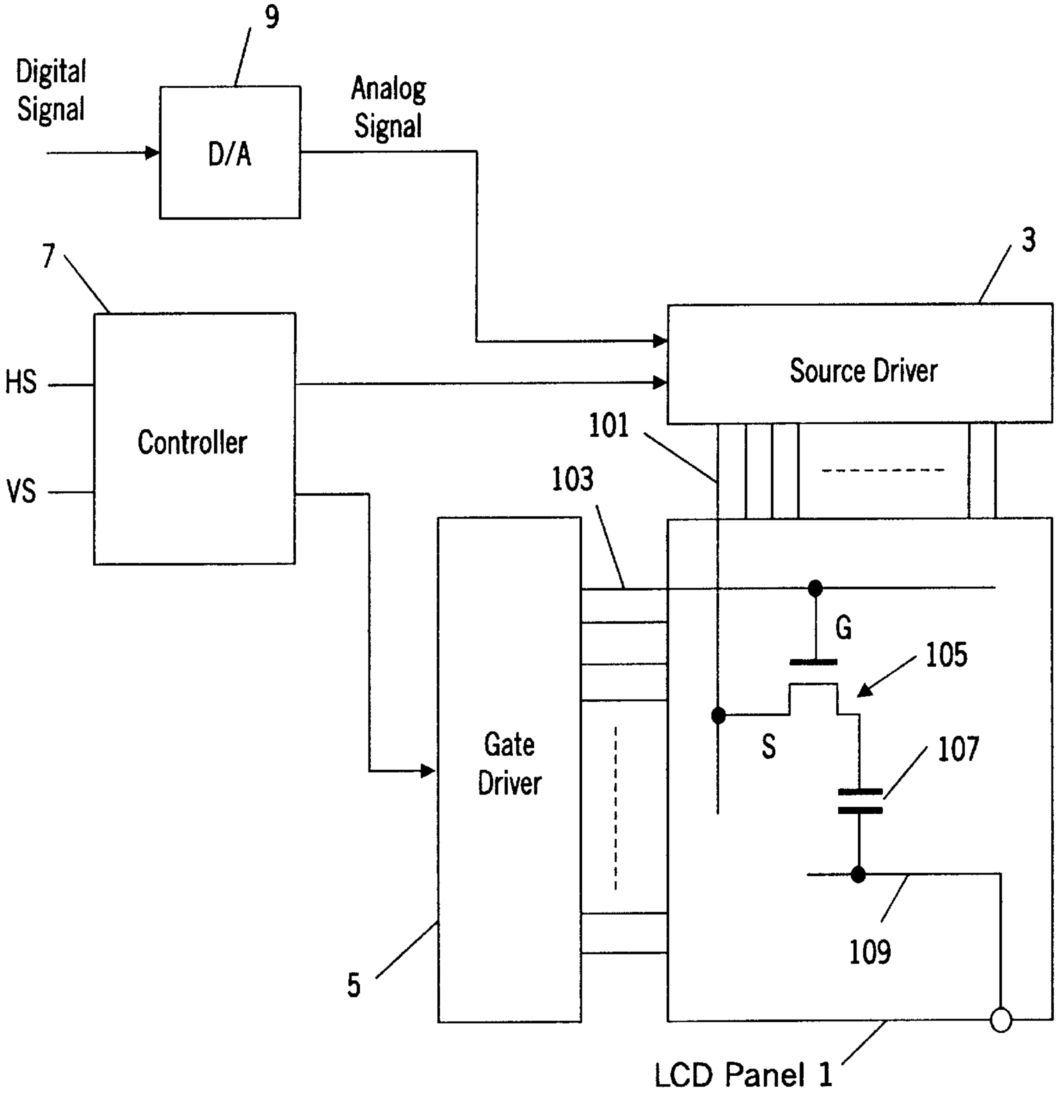
FIG. 1 is a block diagram showing the general outline of the present invention.

The general outline of the present invention is shown in FIG. 1. An LCD panel 1 comprises a number of cells corresponding to the number of pixels, each composed of a transistor 105, liquid crystals (equivalently capacitance 107) and a common electrode 109. To the gate of this transistor 105, a gate line 103 is connected and a source line 101 is connected to the source of the gate. This common electrode 109 is set to a common voltage (on the order of 6.5 V).

A source driver 3 is connected to the source of the transistor 105 provided for each cell of the LCD panel 1 and a gate driver 5 is similarly connected to the gate of the transistor 105. The gate driver 5 and source driver 3 are connected to an external controller 7, while the source driver 3 is connected to a D/A converter 9.

The operation of this arrangement will be described. A digital video signal read from a frame buffer (not shown) is converted into an analog video signal by the D/A converter 9. With an arrangement according to the present invention, this analog signal is provided for each of RGB, a positive and negative signals for each are outputted through different signal lines and at that time a gamma compensation is preferably performed. The generated analog video signal is inputted to the source driver 3. The controller 7 to which a Horizontal Sync. (HS) signal, a Vertical Sync. (VS) signal or the like is inputted generates signals which control a signal output of the source driver 3 and source driver 5. Thus, the source driver 3 outputs an analog video signal from the D/A converter 9 to an appropriate source line 101 at an appropriate timing and the gate driver 5 operates in such a manner as to activate an appropriate gate line 103 at an appropriate timing.

Figure 2:
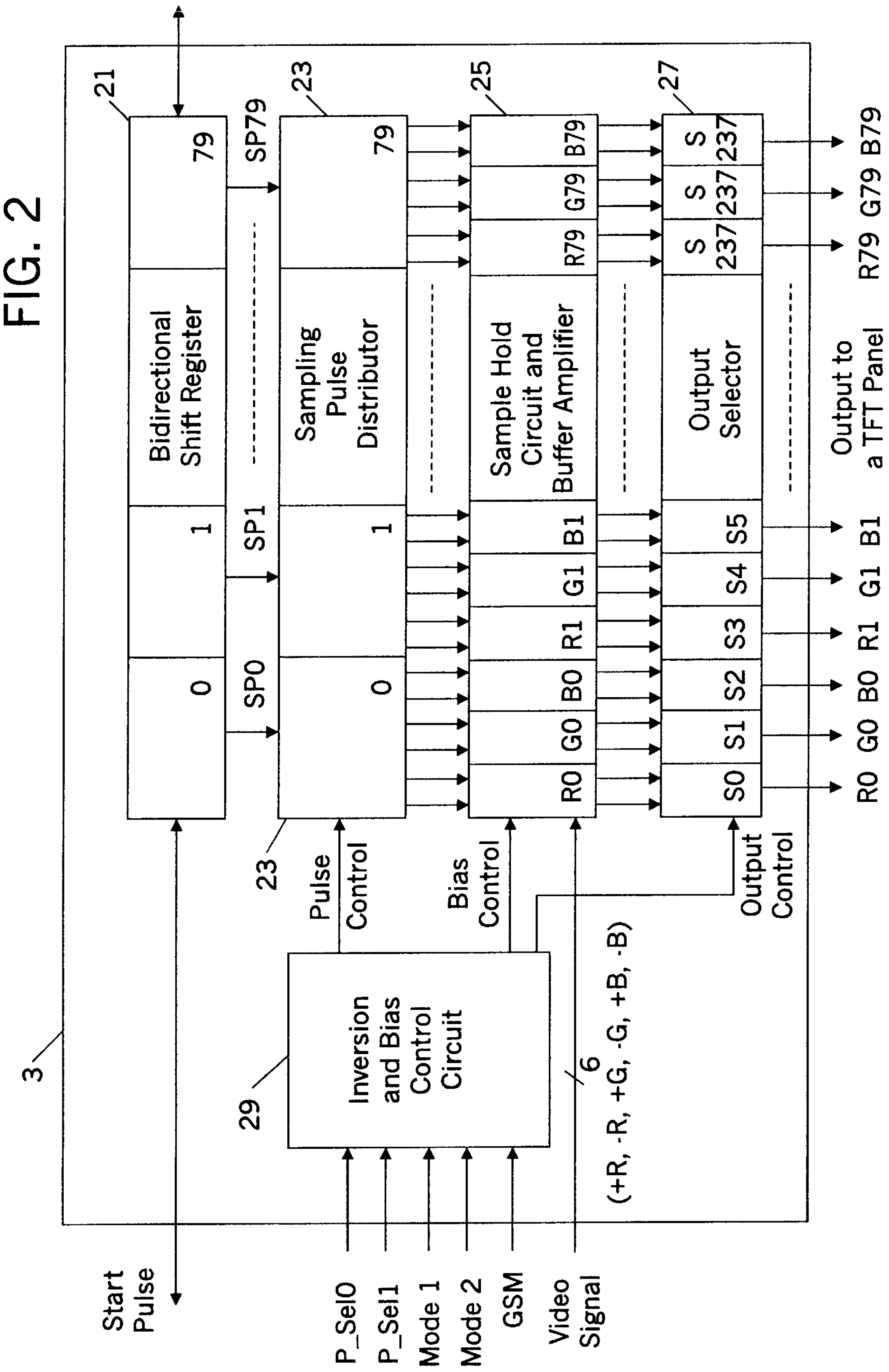
FIG. 2 is a block diagram showing a source driver 3 according to the present invention.

FIG. 2 shows the general outline of the source driver 3 related to the target of the present invention. As shown in FIG. 2. the source driver 3 comprises a bidirectional shift driver 21, a sampling pulse distributer 23, a sample hold circuit and buffer driver 25, an output selector 27 and an inversion and bias control circuit 29. This one source driver is in charge of 240 pixels (80 pixels per color) therefore a panel having 640×480 pixels per color, has 8 drivers driving the panel.

The bidirectional shift register 21 is a register for receiving a start pulse and shifting an output one by one synchronously with a clock, in other words, which turns the output SPO ON in response to receiving the first clock after the start pulse and turns ON the output SP1 at the next clock. The reason why the operation must be bidirectional a possibility of shifting in two directions. This output SPn (n is for generalization) is set to a sampling pulse and by this sampling pulse and an output from the inversion and bias control circuit 29 described later, the source line 101 of the LCD panel 1 is driven at an appropriate timing with an appropriate polarity.

Figure 3:
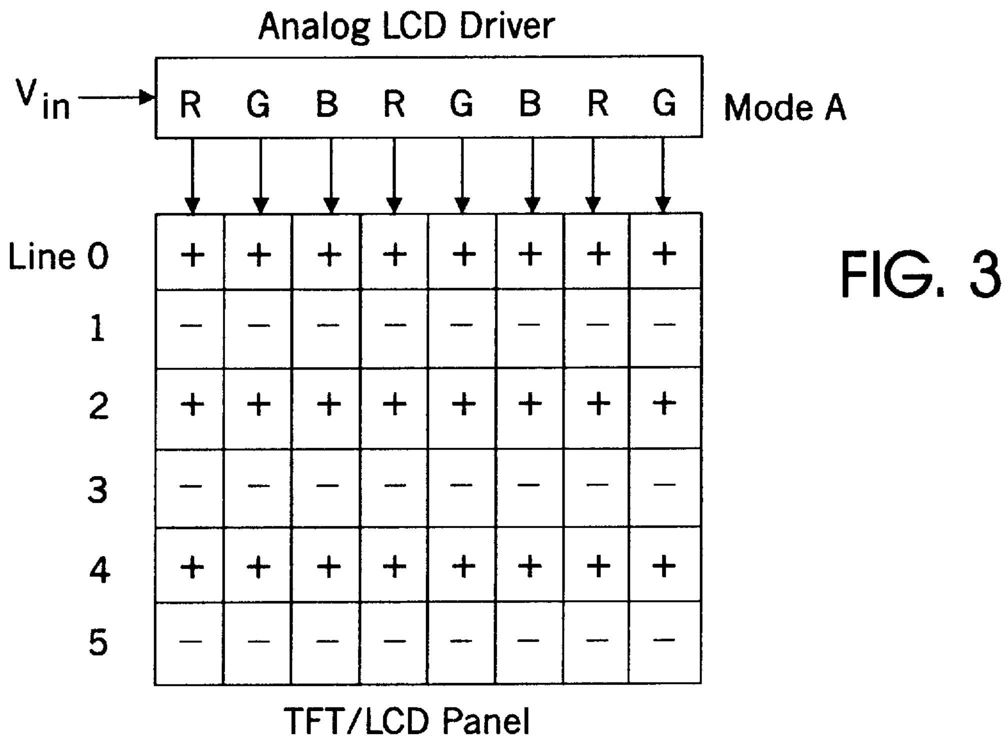
FIG. 3 is a schematic representation showing a case where H inversion is performed with one-side drive.
Figure 4:
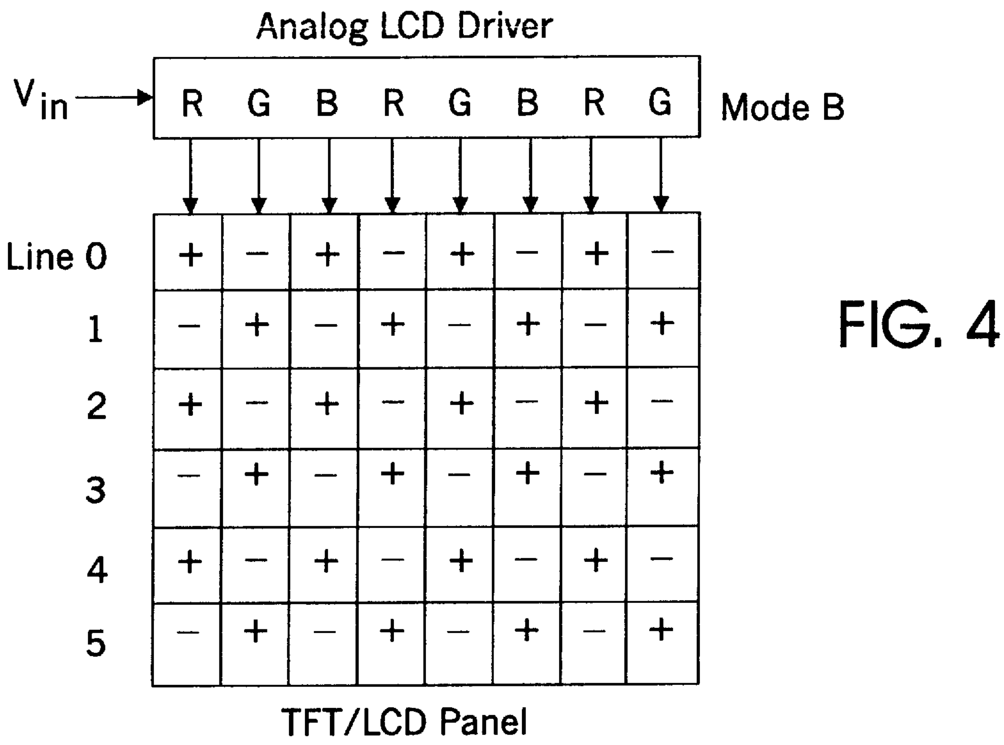
FIG. 4 is a schematic representation showing a case where HV inversion is performed with one-side drive.
Figure 5:
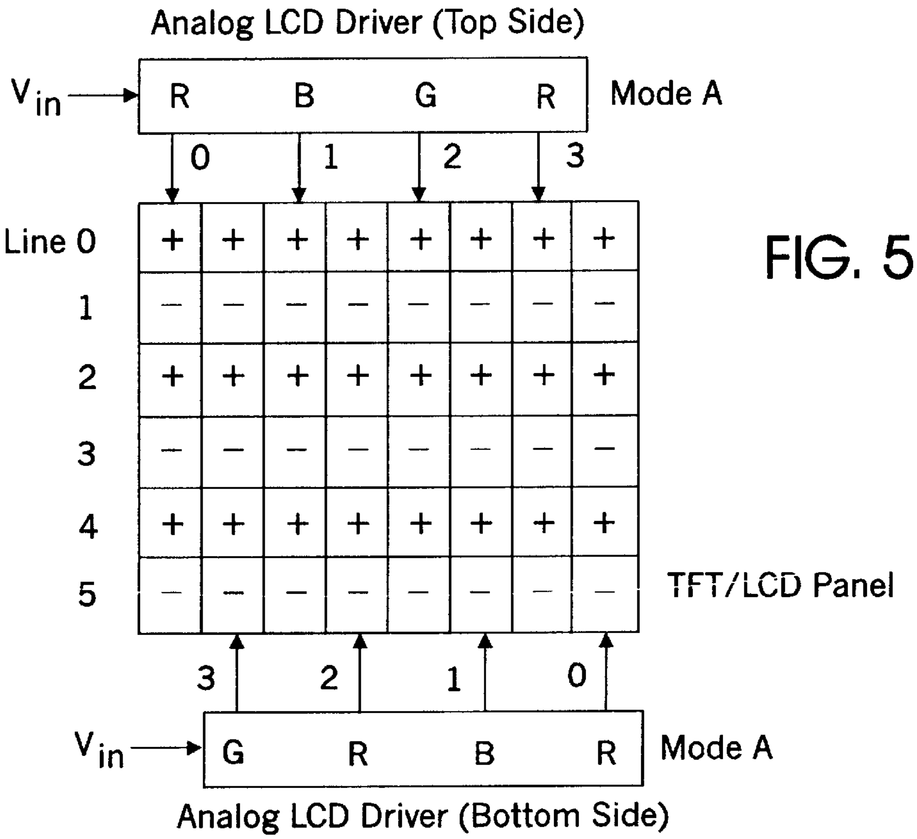
FIG. 5 is a schematic representation showing a case where H inversion is performed with two-side drive.
Figure 6:
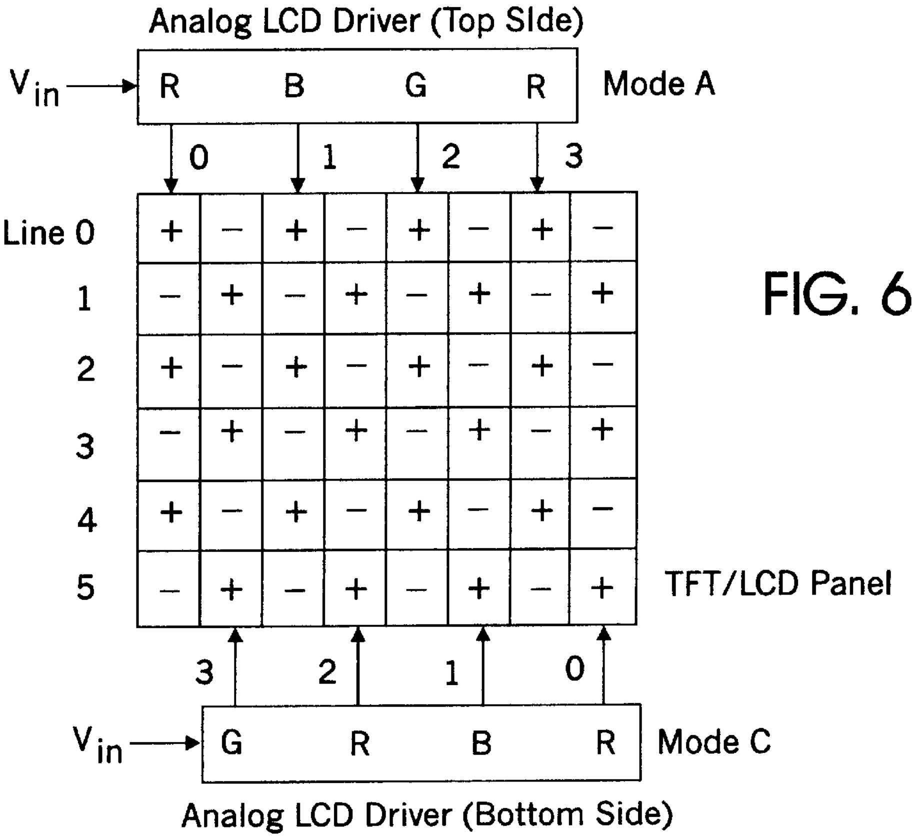
FIG. 6 is a schematic representation showing a case where HV inversion is performed with two-side drive.

Now, the inversion and bias control circuit 29 for controlling the operation of the source driver 3 will be described. To this inversion and bias control circuit 29, P_SelO, P_Sell, Mode 1, Mode 2 and GSM signals are inputted. These P_SelO and P_Sell signals are generated by an external controller 7 (FIG. 1). The Mode 1 and Mode 2 signals are 2-bit signals signifying whether there is to be one-side drive or two-side drive of the LCD panel or whether H inversion drive or HV inversion drive. For example, if the Mode 1 and Mode 2 signals both indicate 0, they are generically referred to as Mode A and Mode A means that H inversion is performed at one-side drive (FIG. 3). Besides, if the Mode 1 signal indicates 0 and the Mode 2 signal indicates 1, it is generically referred to as Mode B and Mode B means that HV inversion is performed at one-side drive (FIG. 4). Furthermore, in the case of two-side drive, a mode is specified for each of the source drivers 3 provided at both sides. If the top side indicates the Mode A and the bottom side also indicates the Mode A, for example, it means that H inversion is performed at two-side drive as shown in FIG. 5. Alternatively, if the top side is in the Mode A and the bottom side is in the generically-called Mode C having the Mode 1 signal indicating 1 and the Mode 2 signal indicating 0, it means that HV inversion is performed at two-side drive (FIG. 6). The GSM signal is a signal for selecting whether the technique described later of reducing the consumed power of the source driver 3 is employed or not.

Figure 7:
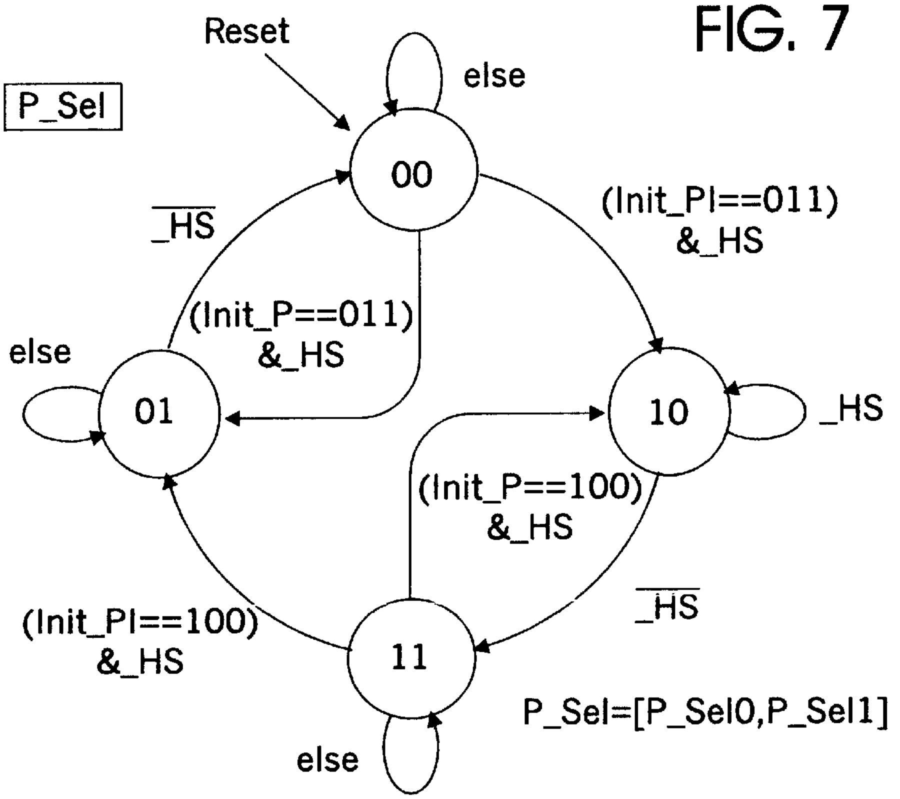
FIG. 7 is an operational illustration of a sequencer 1.
Figure 8:
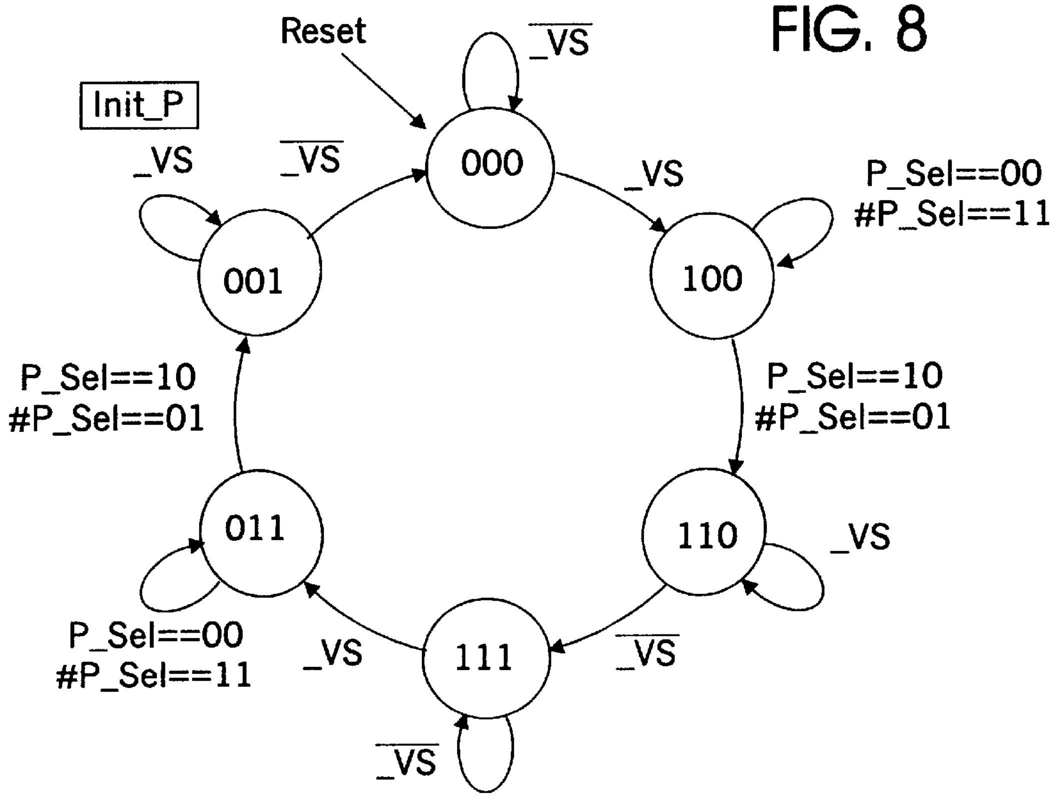
FIG. 8 is an operational illustration of a sequencer 2.

First, the way how to generate P_SelO and P_Sell signals generated in an external controller 7 will be described. These P_SelO and P_Sell signals are generated by two sequencers following the state transitions shown in FIGS. 7 and 8. When the sequencer of FIG. 7 is reset, the state P_Sel changes into a state 00. In this state P_Sel, the first bit represents a P_SelO signal and the second bit represents a P_Sell signal. Then, if the Horizontal Sync. signal (HS) is asserted (becomes _HS) and the state Init_P of the sequencer shown in FIG. 8 is not a state 011 (!=means ), the sequencer changes into a state 10. Thus, the P_SelO signal changes to 1. In the state 00, when the state Init_P is a state 011 and the HS is asserted, the state changes to 01. Thus, the P_Sell signal changes to 1. In the state 00, even if other changes than these two take place, no change from the state 00 occurs. In the state 10, no state change occurs while the HS is asserted, but the state changes to 11 after the assert of HS ends. Thus, the P_Sell signal also changes to 1. In the state of 11, when the Init_P is a state 100 and the HS is again asserted, the state returns to 10. Thus, the P_Sell signal becomes 0. Alternatively, when the Init_P is not the state 100 and the HS is again asserted, the state changes to 01. Thus, the P_SelO changes to 0. Otherwise, the state remains 11. Furthermore if previously asserted HS returns, the state 01 transits to state 00 thus P_Sell also changes to 0. Otherwise, the state remains 01. In this manner, the P_SelO and P_Sell signals change.

Referring to FIG. 8 when the sequencer is reset, the state Init_P changes into a state 000 and remains this till the Vertical Sync. signal (VS) is asserted (becomes _VS). When the VS is asserted, the state changes to 100 and remains the state 100 while the state P_Sel is the state 00 or (designated with #) the state 11 (when the P_SelO signal is 0 and the P_Sell signal is 0, or when the P_SelO signal is 1 and the P_Sell signal is 1). However, if the state P_Sel is 10 or 01 (when the P_SelO signal is 0 and the P_Sell signal is 1, or when the P_SelO signal is 1 and the P_Sell signal is 0), the state changes to 110. In this state 110, if the VS remains asserted, the state does not change, but when the assert of VS ends, the state changes to 111. In the state 111, no state change takes place while the VS is not asserted, but when the VS is again asserted, the state changes to 011. This state 011 undergoes the same change as with the state 100. Thus, there is no state change while the state P_Sel is the state 00 or a state 11, but if the state P_Sel is 10 or 01, the state changes to 001. In the state 001, there is no state change while the VS does not change, but when the assert of VS ends, the state returns to 000.

Figure 9A:
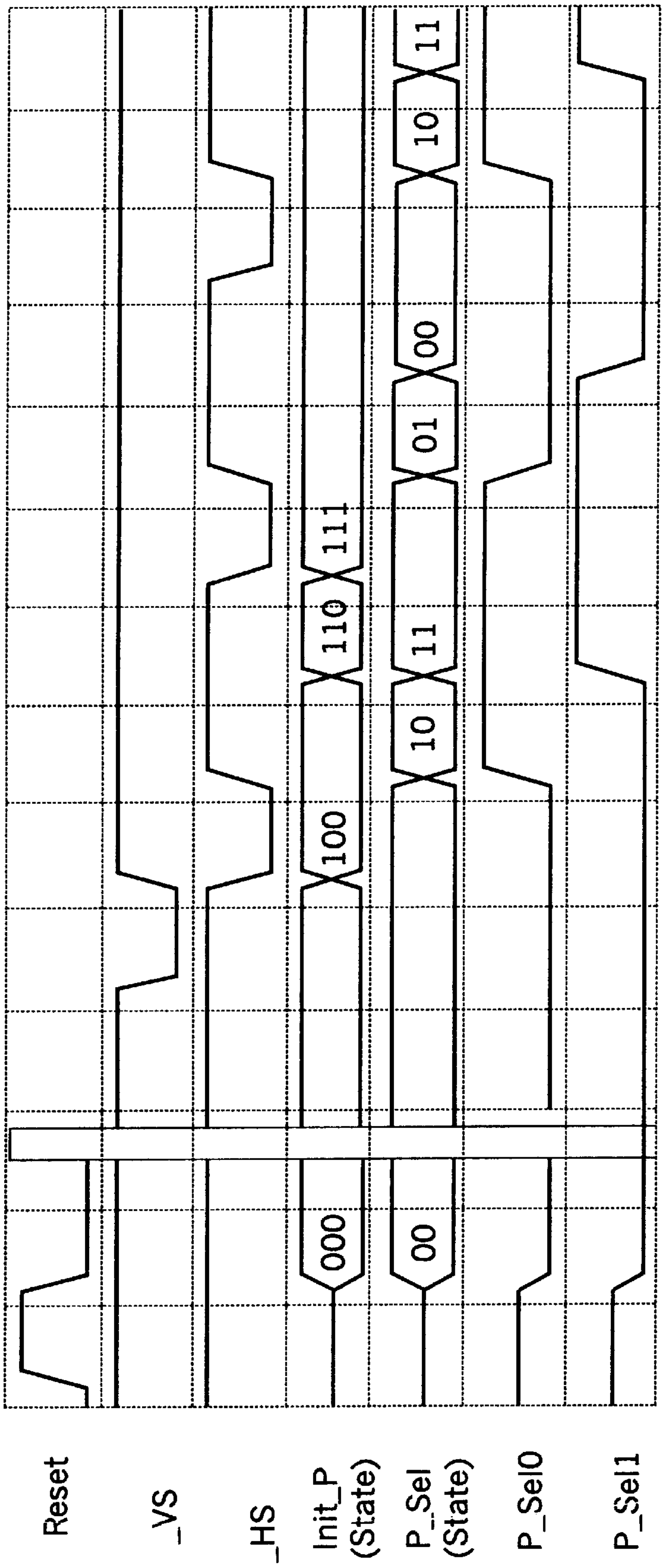
FIGS. 9A and 9B are waveform charts of signals related to the sequencers 1 and 2.
Figure 9B:
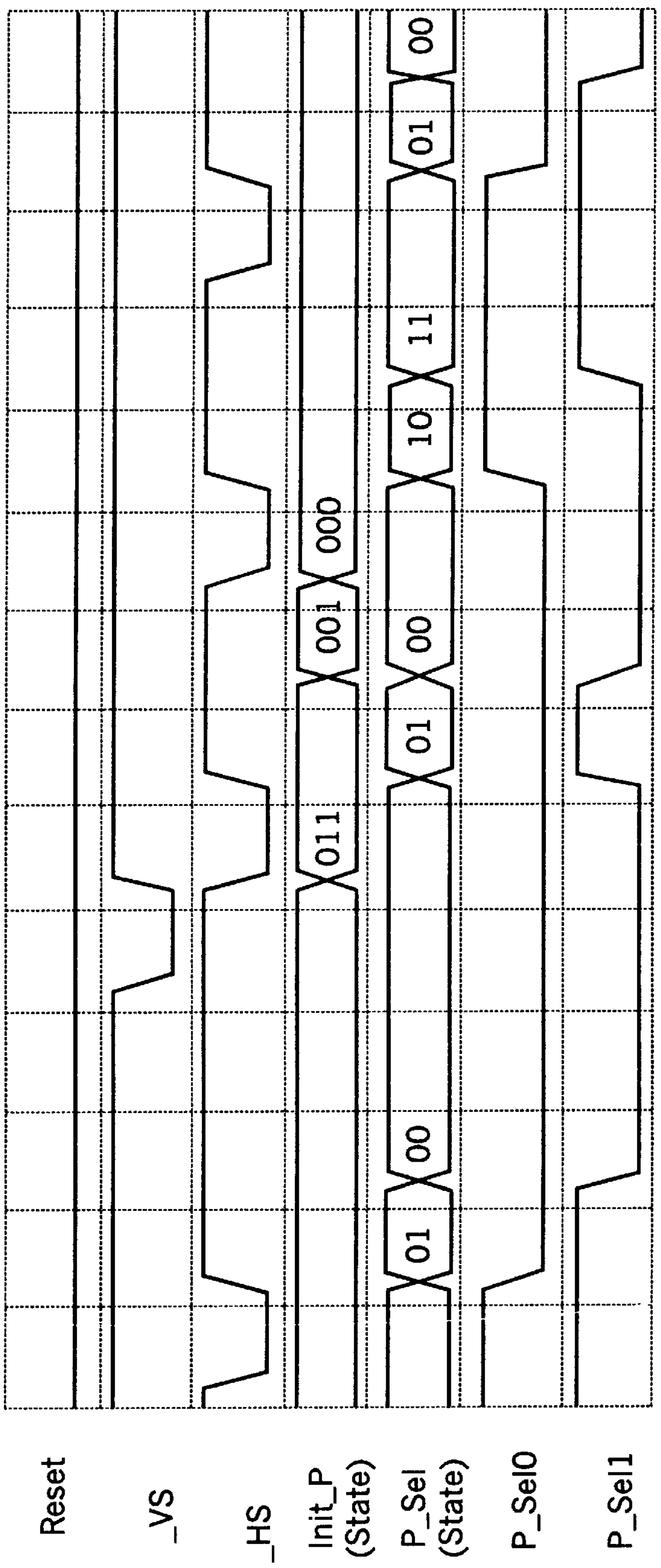

If observed in wave forms of actual signals, these state changes are as shown in FIG. 9. This wave form chart shows the period of VS being asserted twice in two columns. Reference to FIGS. 7 and 8 showing the state transitions of the above-mentioned sequencers leads to understanding that the wave forms follow the above description and accordingly a detailed description is omitted. However, there is a wave form in which the P_Sell alone changes to 1 after the second assertion of the VS in the second column and the assertion of the HS, this occurs because a voltage of different polarity must be given to the same pixel one for each VS period regardless of whether H inversion or HV inversion. Incidentally, a normal operation of the above sequencers requires a condition that the HS is asserted after the VS is asserted.

Figure 10:
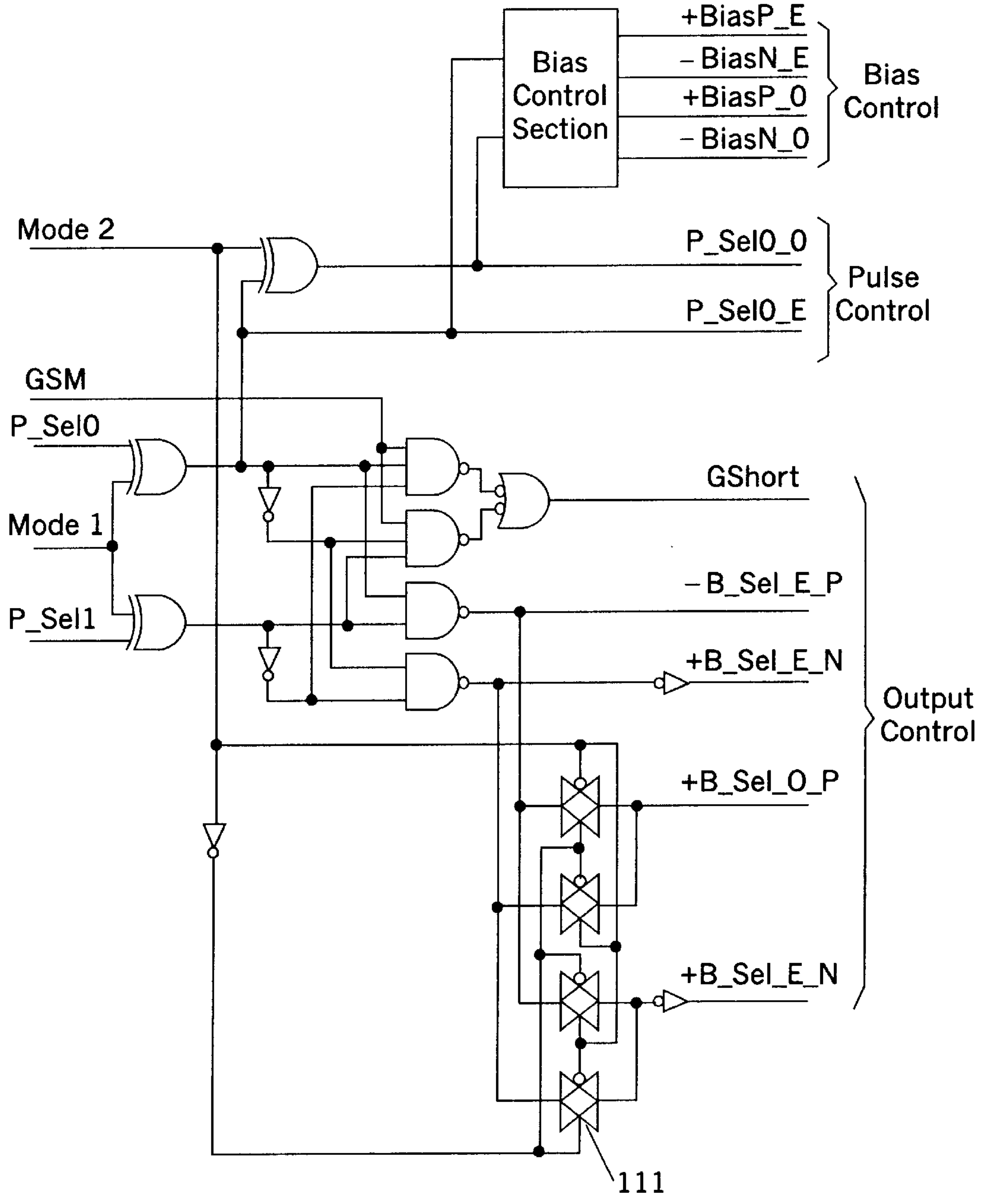
FIG. 10 is an illustration of a pulse control and bias control circuit 29.

Thus far, signals inputted to the inversion and bias control circuit 29 have been described, but next, the processing in the inversion and bias control circuit 29 is shown in FIG. 10. The input signals described above are inputted from the left and outputs are shown on the right. Since individual circuits are combinations of elements well known to those skilled in the art, a detailed description is omitted but the circuit denoted by 111 shows an analog switch. For example, it is a circuit comprising the combination of a P-channel FET and an N-channel FET and may comprise either of them.

The output signals will be described from the top. +Bias P_E, −Bias N_E, +Bias P_O and −Bias N_O are bias control signals as shown in FIG. 2 and are inputted to sample hold circuits and buffer amplifiers 25. The +Bias P_E and +Bias P_O are signals activating the buffer amplifier of a sample hold and buffer amplification unit for a positive input as mentioned later. With respect to the difference between E and O, identification numerals (SO to S239) attached to the output selector 27 connected to the relevant buffer amplifier indicate that +Bias P_E is inputted if they are even and indicate that +Bias P_O is inputted if they are odd. These signals are generated by the bias control section using a current mirror. Similarly, the −Bias N_E and −Bias N_O are signals activating the buffer amplifier of a sample hold and buffer amplification unit for a negative input.

Figure 11:
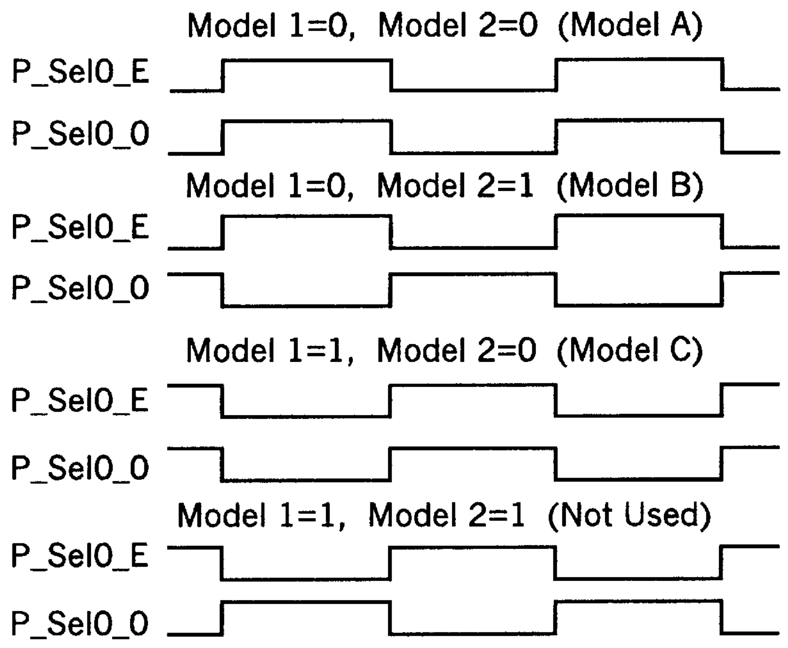
FIG. 11 is a wave form chart of P_SelO_E and P_SelO_O for each mode.

Besides, P_SelO_O and P_SelO_E are pulse control signals in FIG. 2 and are inputted to a sampling pulse distributor 23. These signals are signals for specifying the destination of distributing a sampling pulse generated by the bidirectional shift register 21. The difference between E and O is similar to the one described above and will be described later in detail. FIG. 11 shows signal wave forms of these signals during each mode.

The rest of signals are output control signals in FIG. 2 and are inputted to the output selector 27. The GShort signal is a signal for controlling the power-saving in a case where the power-saving mode is specified by the GSM signal. And, −B_Sel_E_P, −B_Sel_O_P, +B_Sel_E_N and +B_Sel_O_N are used for the control of the output selection of the output selector 27. That is, when the −B_Sel_E_N and −B_Sel_O_N are activated, an output from the buffer amplifier for a positive input are outputted to the LCD panel. Alternatively, when +B_Sel_E_N and +B_Sel_O_N are activated, an output from the buffer amplifier for a negative input are outputted to the LCD panel. The difference between E and O is similar to the one described above.

Figure 12A:
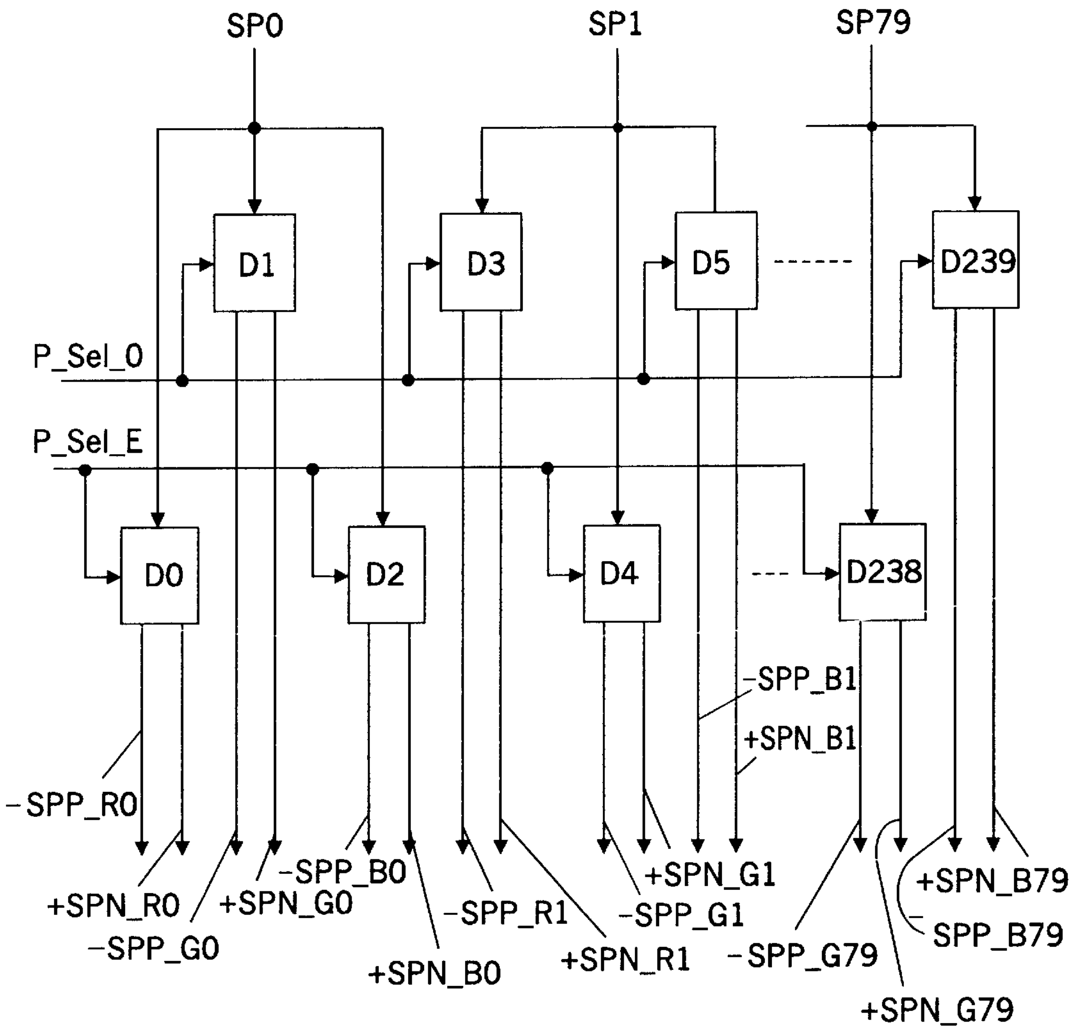
FIGS. 12A and 12B illustrate a sampling pulse distributor 23.
Figure 12B:
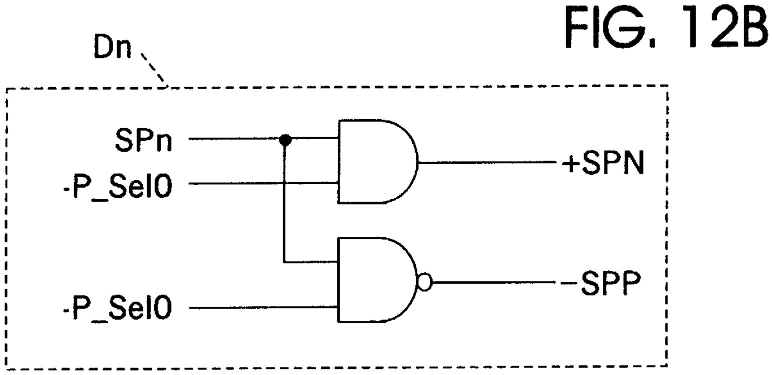

Heretofore, the input signals shown in FIG. 2 can be described as input signals to the sampling pulse distributor 23. Such being the case, next, description of the sampling pulse distributor 23 will be performed using FIG. 12. Outputs from the bidirectional shift register 21 are respectively distributed to three sections Dn. If n of this Dn is odd, the P_SelO_O described above is inputted to the section Dn. Alternatively, if n is even, the P_SelO_E is inputted to the section Dn. Each Dn generates two outputs, i.e., −SPP and +SPN. The suffixes of these −SPP and +SPN are the color in charge and serial number of the output destination. The constitution of each Dn is described in the dotted line, but uses elements well known to those skilled in the art are used and will not be further described. Incidentally, +P_SelO is either P_SelO_O or P_SelO_E and −P_SelO is a signal having an opposite polarity of +P_SelO.

Figure 13:
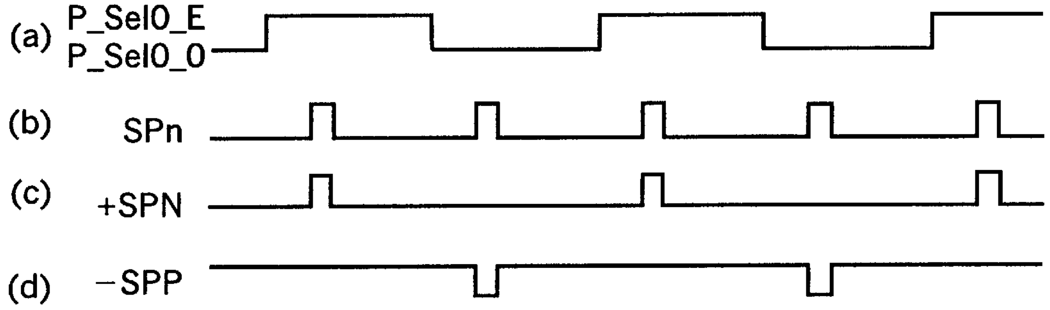
FIG. 13 is a signal wave form showing the processing of the sampling pulse distributor 23.

If expressed in a wave form chart, such processing in the sampling pulse 23 causes changes in the signals in FIG. 13. As shown in FIG. 11, P_SelO_E and P_SelO_O differ with the respective mode specifications, but when P_SelO_E or P_SelO_O forms a wave form as shown in (a) and a sampling pulse from the bidirectional shift register 21 is such as shown in (b), the outputs become such as shown in (c) and (d). To be specific, if P_SelO_E or P_SelO_O is 1, +SPN is activated at the timing and for the period of a sampling pulse. While P_SelO_E or P_SelO_O is 1, −SPP is inactivated. Or if P_SelO_E or P_SelO_O is 0, −SPP is activated at the timing and for the period of the sampling pulse. While P_SelO_E or P_SelO_O is 0, +SPN is inactivated. Like this, with a change in P_SelO_E or P_SelO_O, the period of +SPN and −SPP being active changes.

Figure 14:
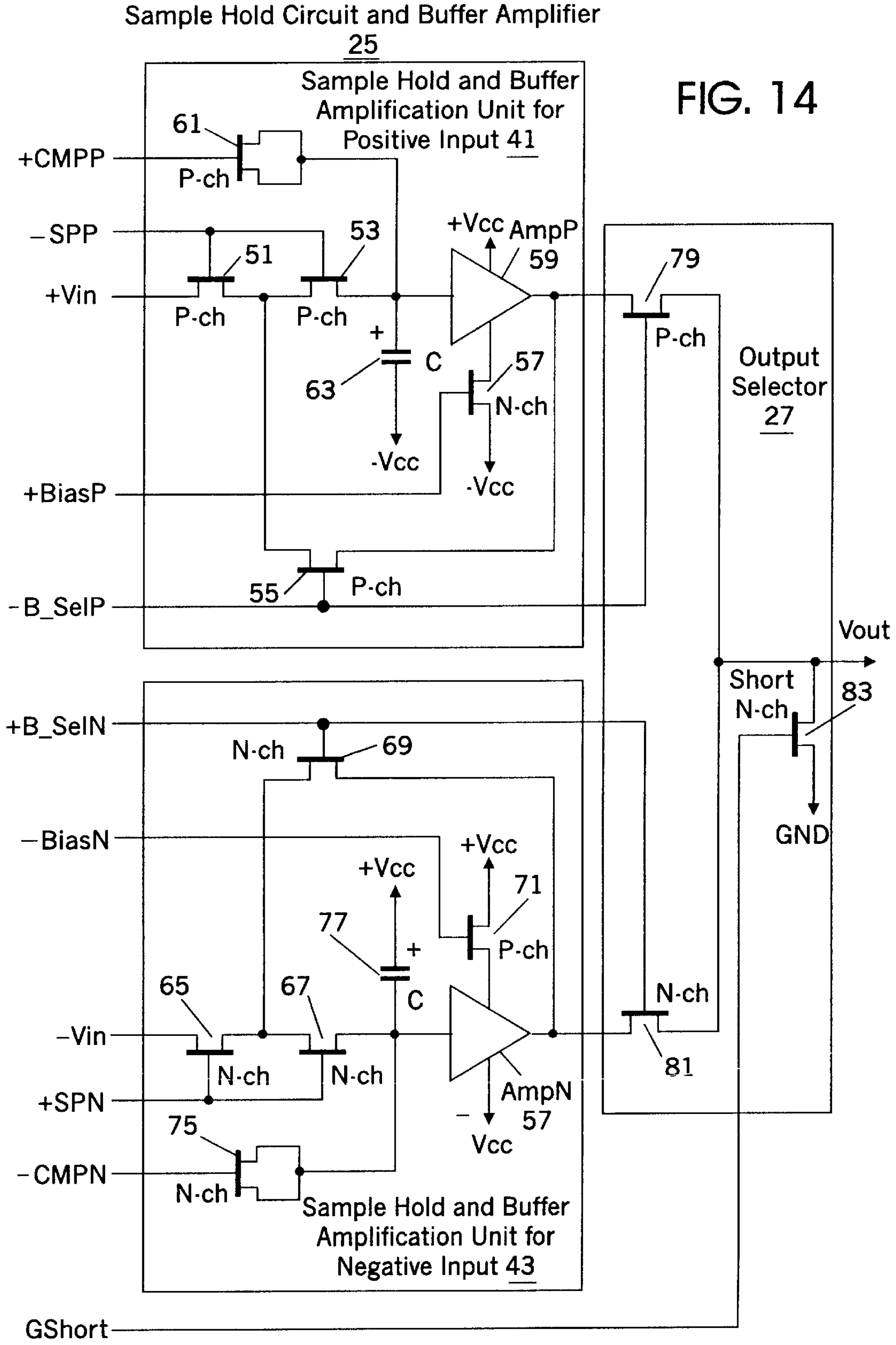
FIG. 14 is an illustration of a sample hold circuit and buffer amplifier 25.

Next, FIG. 14 shows the configuration of sample hold circuits and buffer amplifiers 25 and the output selector 27. Sample hold circuits and buffers amplifiers 25 can be divided into a sample hold circuit and buffer amplification unit 41 for a positive input and a sample hold circuit and buffer amplification unit 43 for a negative input. First, the sample hold circuit and buffer amplification unit 41 for a positive input comprises two P-channel FETs 51 and 53 with the gate connected to −SPP and a P-channel FET 55 with the gate connected to −B_SelP, all of which are connected in the shape of T. To the output side of the P-channel FET 53, a hold capacitor 63 for holding the sampled voltage is connected and further a buffer amplifier 59 is also connected. This buffer amplifier 59 performs only the charging (injection of current). To the power source part of the buffer amplifier 59, an N-channel FET 57 for bias is connected, to the gate of which +Bias P is connected. Furthermore, to the hold capacitor 63, a P-channel FET 61, which is compensating circuit, is connected and compensates voltage held in the hold capacitor 63 due to the gate-source capacity of a switch for sampling at the moment of switching from ON to OFF of the switch for sampling by the voltage of +CMPP compensating signal.

On the other hand, the sample hold circuit and buffer amplification unit 43 for a negative input comprises two N-channel FETs 65 and 67 with the gate connected to +SPN and an N-channel FET 69 with the gate connected to +B_SelN, all of which are connected also in the shape of T. To the output side of the N-channel FET 67, a hold capacitor 77 for holding the sampled voltage is connected and further a buffer amplifier 73 is also connected. This buffer amplifier 73 performs only the discharging (suction of current). To the power source part of the buffer amplifier 73, a P-channel FET 71 for bias is connected, to the gate of which −Bias N is connected. Furthermore, the hold capacitor 77 is connected to a compensating circuit 75 which is controlled by −CMPN compensating signal as with the one for a positive input.

Next, the configuration of the output selector 27 will be described. The output selector 27 comprises a P-channel FET 79 to the gate of which a signal −B_SelP, inputted to the gate of the FET 55, is also inputted, an N-channel FET 81 to the gate of which a signal +B_SelN, inputted to the gate of the FET 69, is also input, and an N-channel FET 83 for G short to the gate of which a GShort signal is inputted.

First, since the configuration of the sample hold circuit is almost identical for a positive input and for a negative input, the operation thereof will be briefly described using one for a positive input as an example. The sample hold circuit generally has a period for sampling and a period for holding the sampled voltage. While activated by −SPP, the FETs 51 and 53 pass +Vin as an input signal, charges the hold capacitor 63 and performs the sampling. The capacity of this hold capacitor 63 affects the operating speed of this sample hold circuit. In other words, with a smaller capacity, the operation becomes speedier. For this period, the FET 55 is turned OFF by −B_SelP. The sampling period (period during which the FETs 51 and 53 are turned ON) is only a period during which an analog signal concerning the pixel in charge of this sample hold circuit and buffer amplifier 25 is inputted. And, when the sampling period ends and the hold period starts, the FET 55 is turned ON and the FETs 51 and 53 are turned OFF. Thereby, an input signal +Vin signal comes not to arrive at the hold capacitor 63. Besides, since the FET 55 is turned ON, an output of the buffer amplifier 59 comes to arrive at the connection point of the FETs 51 and 53. Accordingly, the input and output of the buffer amplifier 59 and the connection point of the FETs 51 and 53 become equal in potential and a noise from +Vin does not arrive at the output of the buffer amplifier 59. Thus, the voltage retained in the hold capacity 63 comes to be outputted accurately as it is. A more detailed content is described in Japanese Patent Application No. 6-322957.

Figure 15:
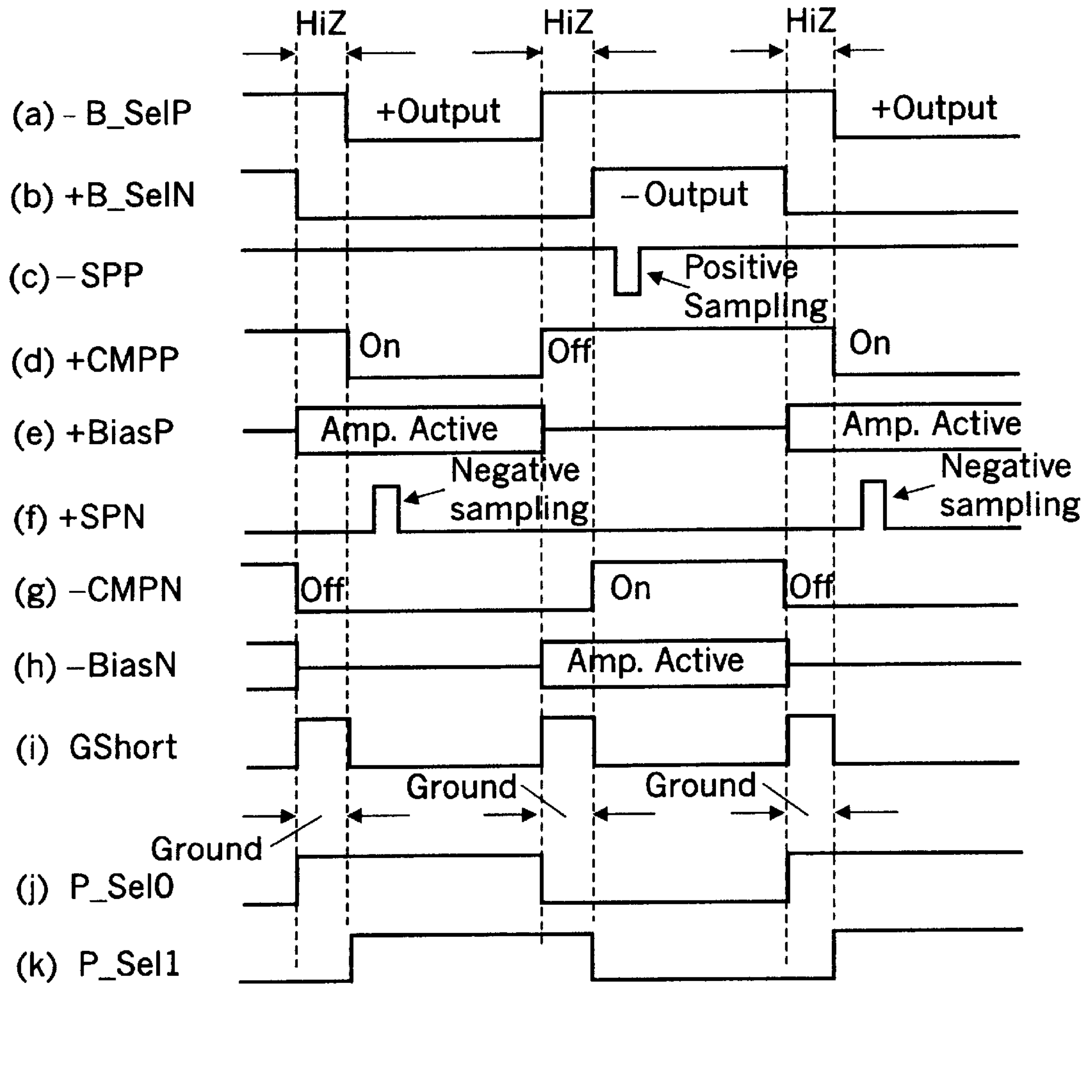
FIG. 15 is a signal wave form showing the operation of the sample hold circuit and buffer amplifier 25.

Thereupon, referring to the wave forms of FIG. 15 base on this, the operation of the arrangement of FIG. 14 will be described. On being activated, +SPN (f) generated by the sampling pulse distributor 23 makes the negative video input −Vin of that time sampled. Thus, because this means the sampling period, −BiasN (h) is not turned ON and the buffer amplifier 73 does not operate. Besides, since +B_SelN (b) is also not activated, the FET 69 is turned OFF and the FET 81 for output selection is also turned OFF, so that the sample hold and buffer amplification unit 43 for a negative input does not output. Incidentally, because there is no need for the compensation of the potential of the hold capacitor 77 during the sampling period, −CMPN (g) is also not activated. In contrast to this, the sample hold and buffer amplification unit 41 for a positive input is during the hold period, −SPP (c) remains OFF and −B_SelP (a) changes to ON. Thus, the FETs 51 and 53 remain OFF and the FET 79 for output selection is turned ON. Besides, since +BiasP (e) is activated, the buffer amplifier 59 becomes in operation and the voltage retained in the hold capacitor 63 is outputted. The buffer amplifier 59 performs the discharging alone. Incidentally, a correction signal +CMPP (d) also turns ON and the correction of voltage is carried out.

Here, −B_SelP (a) and +B_SelN (b) do not fall at the same time. As a result, if the GSM signal described above is turned ON and the power-saving mode is selected, GShort (i) becomes active during a lag between the falls of these signals and the FET 83 turns ON, so that the source line is connected to a common voltage. This operation will be described later. Accordingly, there is a period where an output of the buffer amplifier neither for a positive input nor for a negative input is selected, and the Vout line becomes a HiZ state for this period. Then, the voltage of the source-line makes the common voltage by the FET 83.

And this time, in such a manner as to sample a positive video input +Vin, −SPP (c) generated by the sampling pulse distributor 23 is activated at the timing and for the period shown in the Figure. For this duration, charge is stored in the hold capacitor 63. During this sampling period, +BiasP (e) is turned OFF and the buffer amplifier 59 does not operate. In addition, since −B_SelP (a) is in the OFF state, the FETs 55 and 79 turn OFF and output is not selected. Incidentally, during the sampling period, because no compensation is needed, +CMPP (d) is not activated. This period corresponds to the hold period in the sample hold and buffer amplification unit 43 for a negative input. Thus, −BiasN (h) is activated to allow the buffer amplifier 73 to operate, output is selected with +B_SelN (b) and the voltage retained in the hold capacity 77 is outputted to the source line (Vout) of the LCD panel. At this time, the buffer amplifier 73 performs the charging. Incidentally, to compensate the voltage of the hold capacitor 73, −CMPN (g) is turned ON.

Figure 16:
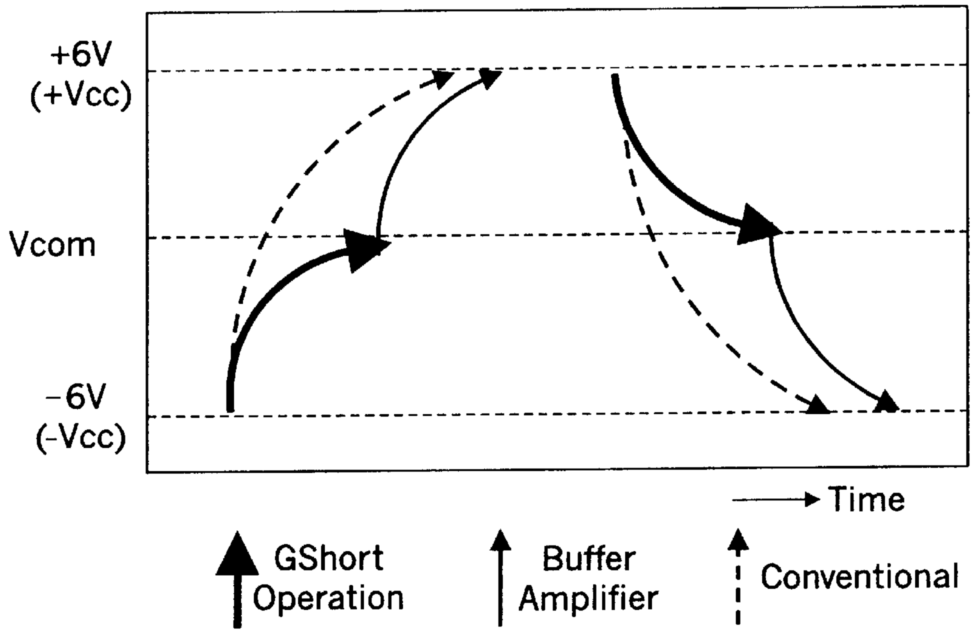
FIG. 16 is an illustration of a G short operation.
Figure 17:
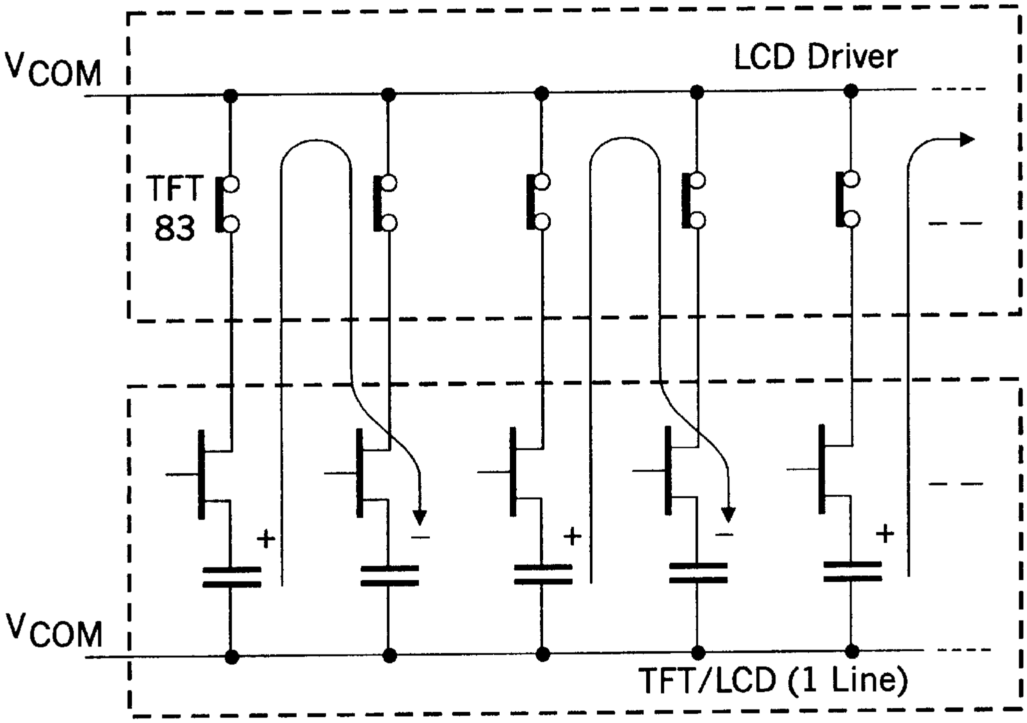
FIG. 17 is an illustration of one effect of a G short operation.

By such repeating, the sample hold operation, the output selection and the GShort operation in response to a GShort signal are carried out. As mentioned above, this GShort operation is an operation to connect the source line (Vout, referred to as data line alternatively) to the common voltage in a state where no buffer amplifier is selected. Why such operation would lead to power saving? This is because the Vout line is shortcircuited to Vcomm (voltage of the opposite electrode) by the GShort operation, thus eliminating the need for the drive portion of those buffer amplifiers, whereas formerly in the case of a change from −6 V (−Vcc) to +6 V (+Vcc) or in the case of a change from +6 V to −6 V, drive is performed entirely over the portion of 12 V, as shown in FIG. 16. Thus, it is only necessary to drive by the portion of more than Vcomm if the drive of +direction is required or to drive by the portion of less than Vcomm if the drive of −direction is required. In this manner, the consumed power becomes nearly half of the former one. This effect can be obtained both in H inversion and in HV inversion. Still more, in the case of HV inversion, there is also an effect that charges are locally cancelled on the LCD panel as shown in FIG. 17 and an effect that the amount of charges entering or exiting the common electrode becomes small. FIG. 17 shows the state that FET 83 performing the GShort operation are ON.

According to the above-mentioned configuration, the configuration conforming to the drive scheme selected by a user to be easily implemented and power saving to be greatly achieved, but the above-mentioned configuration is only one example and may be changed and modified variously. That is, mechanism of an external controller 7 is provided apart from this source driver 3, but may be provided inside the source driver 3. In this manner, input signals are simplified but generally, since an LCD panel cannot be composed of the single source driver 3, the redundancy of circuits takes place. Besides, the logic circuit shown in FIG. 10 is implementable also in other configurations, which is well known to those skilled in the art. Furthermore, the sequencers shown in FIGS. 7 and 8 are also similar.

Industrial Applicability

As mentioned above, the present invention could provide an LCD panel driver enabling H inversion or HV inversion, and one-side drive or two-side drive.

In addition, power consumption in the analog driver could be also reduced.

What is claimed is:

1. An LCD panel driver, comprising:

a first plurality of sample hold and buffer amplification units for positive inputs each including a sample hold circuit for sampling and holding an input video signal having a positive polarity in response to a first control signal and having a first buffer amplifier activated during said holding for charging a data line in an LCD panel;

a second plurality of sample hold and buffer amplification units for negative input each including a sample hold circuit for sampling and holding an input video signal having a negative polarity in response to a second control signal and having a buffer amplifies activated during said holding for discharging a data line in the LCD panel;

an output selector for selecting in response to a third control signal one or another of said buffer amplifies in a group including one of said first plurality of sample hold and buffer amplification units for positive input and one of said second plurality of sample hold and buffer amplification units for negative inputs, said outputs selector having means for making said data line a common voltage selected to reduce power consumption by the buffer amplifiers while neither buffer amplifier in the group is selected;

a bidirectional shift register for generating sampling pulses; and a controller for generating said first and second control signals which control the timing of sampling and holding in said sample hold circuits and said third control signal from a mode specification signal specifying whether one-sided drive or two-sided drive, and HV inversion or H inversion are performed, a fourth control signal created in response to a Horizontal sync. signal and Vertical sync. signal to control the polarity of output voltage to said LCD panel and said sampling pulses.

2. An LCD panel driver, comprising:

a first plurality of sample hold and buffer amplification units for positive inputs each including a sample hold circuit for sampling and holding an input video signal having a positive polarity in response to a first control signal and having a buffer amplifier activated during said holding for charging a data line in an LCD panel;

a second plurality of sample hold and buffer amplification units for negative inputs each including a sample hold circuit for sampling and holding an input video signal having a negative polarity in response to a second control signal and having a buffer amplifier activated during said holding for discharging a data line in the LCD panel;

an output selector for selecting in response to a third control signal one or another of said buffer amplifiers in a group including one of said first plurality of sample hold and buffer amplification units for positive input and one of said second plurality of sample hold and buffer amplification units for negative input, said output selector having means for making said data line a common voltage chosen to reduce power consumption by the buffer amplifiers while no buffer amplifier in the group is selected;

a bidirectional shift register for generating sampling pulses;

a controller for generating said third control signal and a fifth control signal for distributing said sampling pulses to said sample hold and buffer amplification units for positive input and said sample hold and buffer amplification units for negative input from a mode specification signal specifying whether one-sided drive or two-sided drive, and HV inversion or H inversion are to be performed and a fourth control signal created in response to a Horizontal sync. signal and Vertical sync. signal to control the polarity of output voltage to said LCD panel; and a plurality of pulse distributors for generating said first and second control signals which control the timing of sampling and holding in said sample hold circuits from said fifth control signal and said sampling pulses.

3. An LCD panel driver, comprising:

a first plurality of sample hold and buffer amplification units for positive inputs each including a sample hold circuit for sampling and holding an input video signal having a positive polarity in response to a first control signal and having a buffer amplifier activated during said holding for charging a data line in an LCD panel;

a second plurality of sample hold and buffer amplification units for negative inputs each including a sample hold circuit for sampling and holding an input video signal having a negative polarity in response to a second control signal and having a buffer amplifier activated during said holding for discharging a data line in the LCD panel;

an output selector for select in response to a third control signal one or another of said buffer amplifiers in a group including one of said first plurality of sample hold and buffer amplification units for positive input and one of said second plurality of sample hold and buffer amplification units for negative input, said output selector having means for making said data line a common voltage chosen to reduce power consumption by the buffer amplifiers while no buffer amplifier in the group is selected;

a bidirectional shift register for generating sampling pulses; and a controller for generating said third control signal and a fourth control signal which controls the polarity of the output to said LCD panel from a mode signal specifying whether one-sided drive or two-sided drive, and HV inversion or H inversion are to be performed and from a Horizontal sync. signal and Vertical sync. signal; and a plurality of pulse distributors for generating said first and second control signals which control the timing of sampling and holding in said sample hold circuits from said fourth control signal and said sampling pulses.

4. The LCD panel driver as set forth in claim 1, wherein each of said sample hold and buffer amplification units for positive inputs and said sample hold and having buffer amplification units for negative inputs comprises:

a first switching means having an input terminal for said input video signal, said first switching means being switched by a first switch signal;

a second switching means having an input terminal connected to an output terminal of said first switching means, said second switching means being switched by said first switch signal;

a hold capacitor having one terminal connected to the output terminal of said second switching means for charging for said input video signal;

a buffer amplifier unit whose input side is connected to the output terminal of said second switching means; and a third switching means having one terminal connected to the input terminal of said second switching means and having the other terminal connected to an output terminal of said buffer amplifier unit, said third switching means being switched by a second switch signal, said first switch signal changing in such a manner as to activate said first and second switching means for sampling during the sampling period and said second switch signal changing in such a manner as to activate said third switching means for the holding period to provide during the holding period an isolation signal through the third switching means from the output of the buffer amplifier to the second switching means.

5. The LCD panel driver as set forth in claim 4, wherein said hold capacitor is connected to a compensating means for a change in the hold voltage of said hold capacitor.

6. The LCD panel driver of claim 4, wherein said first, second and third switching means for positive inputs are P-channel devices and said first, second and third switching means for negative inputs are N-channel devices.

7. The LCD panel driver of claim 4, wherein said output selector in the group includes a fourth switch means for selecting the buffer sample and hold and buffer amplification units for positive input; and a fifth switch means for selecting the sample and hold and buffer amplification units for a negative input.

8. The LCD panel driver of claim 7, wherein said means for making said data line a common voltage includes a switch means responsive to a shorting signal to short the output of both the fourth and fifth switch means to ground when neither buffer amplifier in the group is selected.

9. A liquid crystal display comprising:

an LCD panel; and an LCD panel driver, wherein said LCD panel driver comprises:

a first plurality of sample hold and buffer amplification units for positive inputs each including a sample hold circuit for sampling and holding an input video signal having a positive polarity in response to a first control signal and having a buffer amplifier activated during said holding for charging a data line in the LCD panel;

a second plurality of sample hold and buffer amplification units for negative inputs each including a sample hold circuit for sampling and holding an input video signal having a negative polarity in response to a second control signal and having a buffer amplifier activated during said holding for discharging a data line in the LCD panel;

an output selector for selecting in response to a third control signal one of said buffer amplifiers in a group including one of said plurality of sample hold and buffer amplification units for positive input and one of said plurality of sample hold and buffer amplification units for negative input, said output selector having means for making said data line a common voltage selected to reduce power consumption of the buffer amplifiers while no buffer amplifier is selected;

a bidirectional shift register for generating sampling pulses; and a controller for generating, said first and second control signals which control the timing of sampling and holding in said sample and hold circuits and said third control signal from a mode specification signal specifying whether one-sided drive or two-sided drive, and HV inversion or H inversion are to be performed, a fourth control signal created in response to a Horizontal sync. signal and Vertical sync. signal to control the polarity of output voltage to said LCD panel and said sampling pulses.

10. The liquid crystal display of claim 9 wherein said controller is for generating said third control signal and a fifth control signal for distributing said sampling pulses to any of said groups including said sample hold and buffer amplification units for positive input and said sample hold and buffer amplification units for negative input from the mode specification signal specifying whether one-sided drive or two-sided drive, and HV inversion or H inversion are to be performed and a fourth control signal created in response to a Horizontal sync. signal and Vertical sync. signal to control the polarity of output voltage to said LCD panel; and a plurality of pulse distributors for generating said first and second control signals which control the timing of sampling and holding in said sample hold circuits from said fifth control signal and said sampling pulses.

11. The liquid crystal display of claim 9 wherein said controller is also for generating said third control signal and a fourth control signal which control the polarity of the output to said LCD display panel from the mode signal specifying whether one-sided drive or two-sided drive, and HV inversion or H inversion are to be performed and from a Horizontal sync. signal and Vertical sync. signal; and a plurality of pulse distributors for generating said first and second control signals which control the timing of sampling and holding in said sample hold circuits from said fourth control signal and said sampling pulses.

12. The LCD panel driver as set forth in claim 9, wherein each of said sample hold and buffer amplification units for positive inputs and said sample hold and having buffer amplification units for negative input comprises:

a first switching means having an input terminal for said input video signal, said first switching means being switched by a first switch signal;

a second switching means having an input terminal connected to an output terminal of said first switching means, said second switching means being switched by said first switch signal;

a hold capacitor having one terminal connected to the output terminal of said second switching means for charging for said input video signal;

a buffer amplifier unit whose input side is connected to the output terminal of said second switching means; and a third switching means having one terminal connected to the input terminal of said second switching means and having the other terminal connected to an output terminal of said buffer amplifier unit, said third switching means being switched by a second switch signal, said first switch signal changing in such a manner as to activate said first and second switching means for sampling during the sampling period and said second switch signal changing in such a manner as to activate said third switching means for the holding period to provide an isolation signal from the output of the buffer amplifier to the second switching means during the holding period.

13. The LCD panel driver as set forth in claim 12, wherein said hold capacitor is connected to a compensating means for a change in the hold voltage of said hold capacitor.

14. The LCD panel driver of claim 12, wherein said first, second and third switching means for positive inputs are P-channel devices and said first, second and third switching means for negative inputs are N-channel devices.

15. The LCD panel driver of claim 12, wherein said output selector in the group includes a fourth switch means for selecting the buffer sample and hold and buffer amplification units for positive input; and a fifth switch means for selecting the sample and hold and buffer amplification units for a negative input.

16. The LCD panel driver of claim 15, wherein said means for making said data line a common voltage includes a switch means responsive to a shorting signal to short the output of both the fourth and fifth switch means to ground when neither buffer amplifier in the group is selected.

* * * * *